US008724178B2

(12) United States Patent
Kunii et al.

(10) Patent No.: US 8,724,178 B2
(45) Date of Patent: May 13, 2014

(54) IMAGE FORMING APPARATUS

(75) Inventors: Hiroyuki Kunii, Kanagawa (JP); Akiyasu Amita, Kanagawa (JP); Shuntaroh Tamaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 357 days.

(21) Appl. No.: 13/158,923

(22) Filed: Jun. 13, 2011

(65) Prior Publication Data

US 2012/0008153 A1 Jan. 12, 2012

(30) Foreign Application Priority Data

Jul. 12, 2010 (JP) ................................. 2010-158105

(51) Int. Cl.
*B41C 1/00* (2006.01)
*H04N 1/407* (2006.01)

(52) U.S. Cl.
USPC .......... 358/3.32; 358/1.9; 358/1.12; 358/3.26

(58) Field of Classification Search
None
See application file for complete search history.

(56) References Cited

U.S. PATENT DOCUMENTS

| | | | |
|---|---|---|---|
| 5,406,705 A * | 4/1995 | Kildune | 29/895.32 |
| 6,074,192 A * | 6/2000 | Mikkelsen | 425/327 |
| 6,741,395 B1 * | 5/2004 | Johnson | 359/619 |
| 6,813,464 B2 | 11/2004 | Amita et al. | |
| 6,957,036 B2 | 10/2005 | Kikuchi et al. | |
| 7,010,257 B2 | 3/2006 | Someya et al. | |
| 7,031,648 B2 | 4/2006 | Takashi et al. | |
| 7,127,202 B2 | 10/2006 | Fujita et al. | |
| 7,139,520 B2 | 11/2006 | Echigo et al. | |
| 7,177,580 B2 | 2/2007 | Nakafuji et al. | |
| 7,233,762 B2 | 6/2007 | Kunii et al. | |
| 7,254,362 B2 | 8/2007 | Kikuchi et al. | |
| 7,269,384 B2 | 9/2007 | Someya et al. | |
| 7,299,003 B2 | 11/2007 | Kurotaka et al. | |
| 7,333,760 B2 | 2/2008 | Baba et al. | |

(Continued)

FOREIGN PATENT DOCUMENTS

| | | |
|---|---|---|
| JP | 2005-119826 | 5/2005 |
| JP | 4026401 | 10/2007 |
| JP | 4231756 | 12/2008 |
| JP | 2009-139708 | 6/2009 |

OTHER PUBLICATIONS

U.S. Appl. No. 13/026,945, filed Feb. 14, 2011, Kenji Ishii, et al.

(Continued)

*Primary Examiner* — Richard Zhu

(74) *Attorney, Agent, or Firm* — Oblon, Spivak, McClelland, Maier & Neustadt, L.L.P.

(57) ABSTRACT

An image forming apparatus includes an image forming unit to form a color toner image using a color toner and a transparent layer using a transparent toner on a sheet of recording media, a sheet conveyance unit to transport the sheet, a 3D display lens forming unit disposed downstream from the image forming unit in a sheet conveyance direction, and a controller. The 3D display lens forming unit includes a shaping member including an uneven portion having predetermined surface unevenness, and a pressure member to press the shaping member against the sheet, forming a shaping nip between the shaping member and the pressure member. The 3D display lens forming unit shapes the transparent layer that is an outermost layer on the sheet into a stereoscopic display lens by transferring the surface unevenness of the uneven portion of the shaping member to the transparent layer formed on the sheet.

10 Claims, 4 Drawing Sheets

(56) References Cited

U.S. PATENT DOCUMENTS

| | | | | |
|---|---|---|---|---|
| 7,359,666 | B2 | 4/2008 | Takashi et al. | |
| 7,369,803 | B2 | 5/2008 | Echigo et al. | |
| 7,433,641 | B2 | 10/2008 | Kikuchi et al. | |
| 7,526,242 | B2 | 4/2009 | Takagaki et al. | |
| 7,570,911 | B2 | 8/2009 | Nakafuji et al. | |
| 7,583,922 | B2 | 9/2009 | Takashi et al. | |
| 7,672,053 | B2 * | 3/2010 | Suzuki et al. | 359/619 |
| 7,738,827 | B2 | 6/2010 | Someya et al. | |
| 7,912,392 | B2 | 3/2011 | Yoshinaga et al. | |
| 7,925,177 | B2 | 4/2011 | Ishii et al. | |
| 8,145,115 | B2 * | 3/2012 | Yamanouchi et al. | 399/342 |
| 8,157,371 | B2 * | 4/2012 | Suzuki | 347/105 |
| 8,190,042 | B1 * | 5/2012 | Egert et al. | 399/45 |
| 8,430,500 | B2 * | 4/2013 | Suzuki | 347/101 |
| 2003/0068184 | A1 * | 4/2003 | Miyano | 400/582 |
| 2004/0113316 | A1 * | 6/2004 | Fujii et al. | 264/284 |
| 2004/0219302 | A1 * | 11/2004 | Krause et al. | 427/496 |
| 2005/0012945 | A1 * | 1/2005 | Richer | 358/1.9 |
| 2005/0158075 | A1 | 7/2005 | Echigo et al. | |
| 2005/0160294 | A1 * | 7/2005 | LaBrec et al. | 713/201 |
| 2006/0013624 | A1 | 1/2006 | Kurotaka et al. | |
| 2006/0092519 | A1 * | 5/2006 | Hasei | 359/618 |
| 2007/0014600 | A1 | 1/2007 | Ishii et al. | |
| 2007/0103777 | A1 * | 5/2007 | Suzuki | 359/463 |
| 2009/0169232 | A1 | 7/2009 | Kunii et al. | |
| 2010/0002205 | A1 * | 1/2010 | Suzuki | 355/22 |
| 2010/0013903 | A1 * | 1/2010 | Suzuki | 347/244 |
| 2010/0028554 | A1 * | 2/2010 | Ogawa et al. | 427/487 |
| 2010/0232818 | A1 | 9/2010 | Kunii | |
| 2010/0290822 | A1 | 11/2010 | Hasegawa et al. | |
| 2011/0026988 | A1 | 2/2011 | Yoshikawa et al. | |
| 2011/0044734 | A1 | 2/2011 | Shimokawa et al. | |
| 2011/0051201 | A1 | 3/2011 | Hashimoto et al. | |
| 2011/0052282 | A1 | 3/2011 | Shinshi et al. | |
| 2011/0058862 | A1 | 3/2011 | Yamaguchi et al. | |
| 2011/0058863 | A1 | 3/2011 | Shinshi et al. | |
| 2011/0058864 | A1 | 3/2011 | Fujimoto et al. | |
| 2011/0058865 | A1 | 3/2011 | Tokuda et al. | |
| 2011/0058866 | A1 | 3/2011 | Ishii et al. | |
| 2011/0064443 | A1 | 3/2011 | Iwaya et al. | |
| 2011/0064494 | A1 | 3/2011 | Amita et al. | |
| 2011/0076071 | A1 | 3/2011 | Yamaguchi et al. | |
| 2011/0085832 | A1 | 4/2011 | Hasegawa et al. | |

OTHER PUBLICATIONS

U.S. Appl. No. 13/048,160, filed Mar. 15, 2011, Yoshiki, Yamaguchi, et al.

U.S. Appl. No. 12/926,661, filed Dec. 2, 2010.

U.S. Appl. No. 12/964,090, filed Dec. 9, 2010, Naoki Iwaya, et al.

U.S. Appl. No. 13/014,306, filed Jan. 26, 2011, Kenji Ishii, et al.

U.S. Appl. No. 13/027,533, filed Feb. 15, 2011, Hiroshi Yoshinaga, et al.

U.S. Appl. No. 12/929,626, filed Feb. 4, 2011.

U.S. Appl. No. 12/929,326, filed Jan. 14, 2011.

* cited by examiner

IMAGE FORMING APPARATUS

CROSS-REFERENCE TO RELATED APPLICATIONS

This patent specification is based on and claims priority from Japanese Patent Application No. 2010-158105, filed on Jul. 12, 2010 in the Japan Patent Office, which is hereby incorporated by reference herein in its entirety.

BACKGROUND OF THE INVENTION

1. Field of the Invention

The present invention generally relates to an image forming apparatus, such as a copier, a printer, a facsimile machine, or a multifunction machine capable of at least two of these functions, that form an image on a sheet of recording media using powdered image formation particles such as toner.

2. Description of the Background Art

At present, with rapid improvement in the performance of data processing systems such as computers, copiers, printers, facsimile machines, or word processors, various types of recording media, such as paper, cloth, plastic, and overhead projector (OHP) film, have been developed for the data processing system to outputs data.

For example, there are recording media covered with a translucent stereoscopic display lens or lens array having surface unevenness. The stereoscopic display lens may be a lenticular lens or fly's eye lens. Stereoscopic display lenses are widely used for commercial and entertainment purposes such as posters, billboards, compact disc (CD) jackets, and trading cards due to their stereoscopic and eye-catching effects.

Lenticular lenses are used in lenticular methods to attain stereoscopic view without a special device for stereoscopic effects. Fly's eye lenses are used in fly's eye methods to cause vertical parallax in addition to lateral parallax.

These methods give visual effects to the image using parallax that is caused because left and right eyes of a person catch different objects. Using these methods, three-dimensional (3D) images or two-dimensional (2D) images that display different images depending on the viewpoint can be produced. In other words, because the positions viewed by right and left eyes are different, right and left eyes view different images. This parallax produces an illusion, making the 3D image stereoscopic. The basis of 2D images is similar to that of 3D images. For example, there are 2D images that show multiple pictures that are switched depending on the viewing angle. Switching such multiple pictures serially can produce animation effects, and the object illustrated in the pictures can look moving.

For example, JP-2005-119826-A proposes producing 3D images by bonding each page of electrophotographic images to a lenticular sheet serving as a stereoscopic display lens substantially consecutively.

Additionally, JP-2009-139708-A proposes producing stereoscopic display lenses by ejecting a transparent resin three-dimensionally on electrophotographic images, making the images stereoscopic.

The first and second approaches described above, however, have several drawbacks. For example, because the image forming material, namely, toner forming electrophotographic images, and the material forming the stereoscopic display lenses are different, adhesion between the image and the stereoscopic display lens is insufficient. Additionally, because the methods for forming images and lenses are significantly different, the apparatus becomes bulkier.

It is to be noted that, although JP-4026401-B proposes a method including forming an uneven transparent toner layer on a color toner image, this method aims at preventing defective images due to blister resulting from expansion of vapor or gases to produce high-gloss images. Thus, it is not for forming stereoscopic display lenses.

SUMMARY OF THE INVENTION

In view of the foregoing, in one illustrative embodiment of the present invention, an image forming apparatus includes an image forming unit, a sheet conveyance unit to transport the sheet, a 3D display lens forming unit disposed downstream from the image forming unit in a sheet conveyance direction, and a controller operatively connected to the image forming apparatus as well as the 3D display lens forming unit. The image forming unit includes a color toner station to form a color toner image using a color toner and a transparent toner station to form a transparent layer using a transparent toner on a sheet of recording media. The 3D display lens forming unit includes a shaping member and a pressure member to press the shaping member against an imaging surface of the sheet. The shaping member includes an uneven portion having predetermined surface unevenness, and a shaping nip is formed between the shaping member and the pressure member pressing against each other. The uneven portion of the shaping member is pressed against the transparent layer that is an outermost layer on the sheet, transferring the surface unevenness thereof to the sheet. Thus, the 3D display lens forming unit shapes the transparent layer into a stereoscopic display lens.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
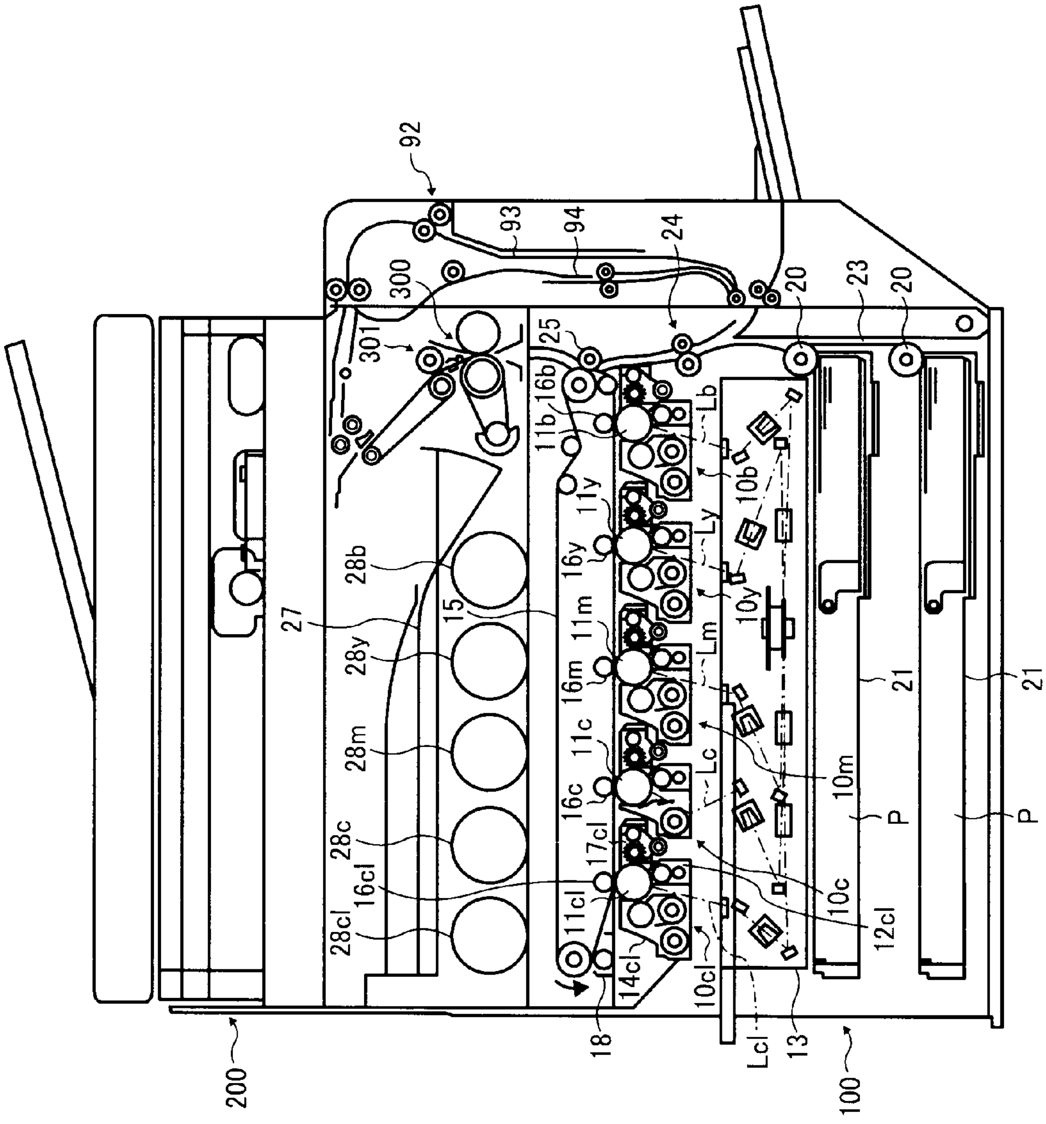
FIG. 1 is a cross-sectional view that illustrates an interior of an image forming apparatus according to an illustrative embodiment.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a multicolor image forming apparatus according to an illustrative embodiment of the present invention is described.

FIG. 1 is a cross-sectional view that illustrates an interior of an image forming apparatus according to the present embodiment. It is to be noted that the subscripts cl, c, m, y, and b attached to the end of each reference numeral indicate only that components indicated thereby are used for forming transparent, cyan, magenta, yellow, and black images, respectively, and hereinafter may be omitted when color discrimination is not necessary. In FIG. 1, reference numerals 100 denotes an apparatus body of the image forming apparatus, and 200 denotes an image reading unit provided above the apparatus body 100.

The image forming apparatus according to the present embodiment includes an image forming unit to form colored images using color toner and a transparent layer using transparent toner on sheets P of recording media, a shaping belt 30 serving as a shaping member, and a 3D display lens forming unit 301 for forming a stereoscopic display lens on the sheet P. The shaping belt 30 is positioned downstream from the image forming unit in a sheet conveyance direction in which the sheet P is transported and has predetermined surface unevenness. The 3D display lens forming unit 301 presses the shaping belt 30 against the transparent layer on the sheet P, transferring the surface unevenness of the shaping belt 30 to the transparent layer, making the transparent layer a stereoscopic display lens.

The image forming unit forms images on the sheet P electrophotographically and includes image forming stations **10*c*1, 10*c*, 10*m*, 10*y*, and 10*b*; a toner transfer unit including an intermediate transfer belt 15 (an intermediate transfer member) and a secondary-transfer unit 25; and a fixing device 300**.

A configuration of the image forming apparatus is described in further detail below.

Referring to FIG. 1, the image forming apparatus according to the present embodiment is tandem type, and the apparatus body 100 includes the five image forming stations **10*c*1, 10*c*, 10*m*, 10*y*, and 10*b* arranged in parallel. A common writing device 13 is provided for the image forming stations 10*c*1, 10*c*, 10*m*, 10*y*, and 10*b*. The five image forming stations 10 have a similar configuration except the color of the toner used therein, and image formation and image transfer in the image forming station 10*c*1 is described below, thus omitting descriptions of those in other image forming stations 10**.

The image forming station **10*c*1 includes a drum-shaped photoreceptor 11*c*1. A charging device 12*c*1, a development device 14*c*1, a primary-transfer unit 16*c*1, and a primary-cleaning unit 17*c*1 are provided around the photoreceptor 11*c*1** clockwise in that order.

In the image forming station **10*c*1, as the photoreceptor 11*c*1 rotates clockwise in FIG. 1, initially the charging device 12*c*1 applies a bias voltage to the photoreceptor 11*c*1, electrically charging the photoreceptor 11*c*1** uniformly.

Then, the common writing device 13 directs a laser beam Lcl to the photoreceptor **11*c*1, forming an electrostatic latent image thereon, according to image signals, which are read by the image reading unit 200 when the image forming apparatus is a copier, transmitted from a host when the image forming apparatus is a printer, and transmitted via telephone lines when the image forming apparatus is a facsimile machine. Subsequently, the development device 14*c*1 develops the electrostatic latent image with transparent toner, thus forming a transparent layer on the photoreceptor 11*c*1**.

After primary-image transfer, the primary-cleaning unit **17*c*1 cleans the surface of the photoreceptor 116, removing any toner remaining thereon to initialize the photoreceptor 11*c*1**.

In other image forming stations 10, the development devices 14 develop electrostatic latent images formed on the respective photoreceptors 11 with the respective color toners into single-color toner images thereon.

The intermediate transfer belt 15 rotates counterclockwise in FIG. 1 while being in contact with the photoreceptors 11. As the intermediate transfer belt 15 thus rotates, the primary-transfer units 16 transfer the transparent layer and the single-color images from the respective photoreceptors 11 onto the intermediate transfer belt 15 sequentially from the transparent layer. The transparent layer and the single-color images are superimposed one on another, and thus a multicolor image is formed on the transparent layer on the intermediate transfer belt 15.

Further, sheet cassettes 21 containing the sheets P and feed rollers 20 are provided in a lower portion of the apparatus body 100. One of the feed rollers 20 is selectively rotated, and thus the sheet P is transported from the corresponding sheet cassette 21 through a sheet conveyance path 23 to a pair of registration rollers 24. The registration rollers 24 clamp the sheet P therebetween and stop the sheet P. Then, the registration rollers 24 start rotating, forwarding the sheet P to the secondary-transfer unit 25, timed to coincide with the multicolor image formed on the intermediate transfer belt 15. The secondary-transfer unit 25 secondarily transfers the multicolor image and the transparent layer from the intermediate transfer belt 15 onto the sheet P. It is to be noted that, at that time, the transparent layer is positioned outside the multicolor image on the sheet P.

It is to be noted that the feed rollers 20 and the registration rollers 24 together forms a sheet conveyance unit.

The sheet P carrying the multicolor image is further transported upward in FIG. 1 through the sheet conveyance path 23. The fixing device 300 fixes the image on the sheet P when the sheet P passes through a fixing nip therein. The 3D display lens forming unit 301 includes a pressure roller 40 to press against the shaping belt 30. The pressure roller 40 and the shaping belt 30 can engage and disengage from each other, and a nip is formed when they are pressed to each other. The pressure roller 40 presses the shaping belt 30 against an imaging surface of the sheet P.

When users select a 3D image mode for forming 3D images or an increased gloss mode for increasing the gloss level of the image, depending on the type of the sheet P, the sheet P is transported through the nip in the 3D display lens forming unit 301 and stacked on a stack unit 27 formed on an upper side of the apparatus body 100. When the image is not made stereoscopic or the gloss level of the image is not increased, the sheet P is transported through the 3D display lens forming unit 301 to the stack unit 27 with the shaping belt 30 disengaged from the pressure roller 40.

The toner transfer unit further includes a secondary-cleaning unit 18 to clean the intermediate transfer belt 15. After secondary-image transfer, the secondary-cleaning unit 18 cleans the surface of the intermediate transfer belt 15, removing any toner remaining thereon to initialize the intermediate transfer belt 15.

It is to be noted that, in FIG. 1, reference characters **28*c*1, 28*c*, 28*m*, 28*y*, and 28*b* represent toner bottles containing respective color toners supplied to the development devices 14*c*1, 14*c*, 14*m*, 14*y*, and 14*b* in the image forming stations 10*c*1, 10*c*, 10*m*, 10*y*, and 10*b*. Reference numeral 92 represents a re-feeding unit to transport the sheet P again to the image forming unit after the sheet P is discharged from the 3D display lens forming unit 301**. The toner used in the present embodiment may be known toners for electrophotographic image formation.

Although the description above concerns forming multicolor images on sheets P, the above-described image forming apparatus can select one or more of the image forming stations 10_c_1, 10_c_, 10_m_, 10_y_, and 10_b_ according to selection by the user and form either single color images or multicolor images in the selected mode, namely, a single color mode or a multicolor mode. In addition, transparent layers may be formed as required.

Figure 2:
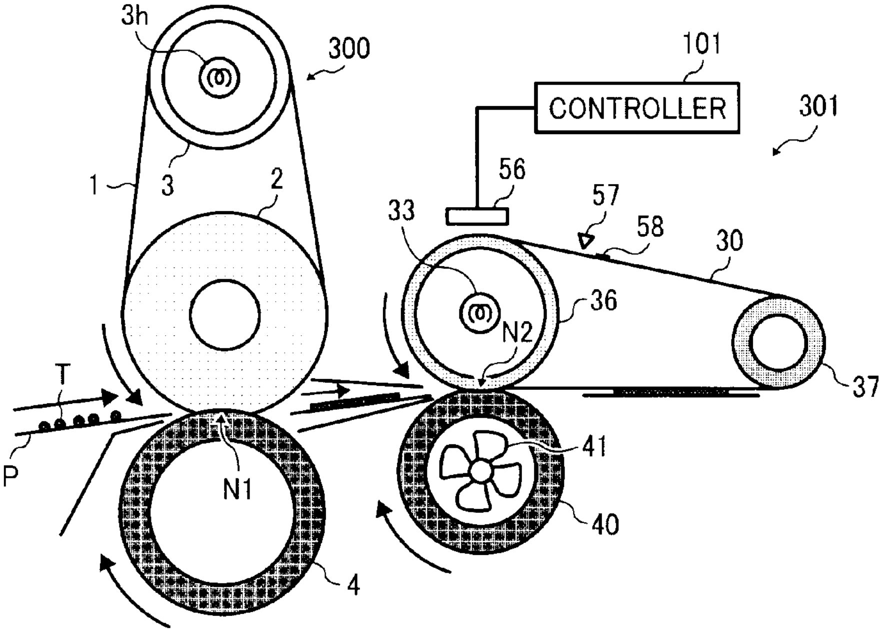
FIG. 2 is a schematic axial view of a fixing device and a stereoscopic display lens forming unit in the image forming apparatus shown in FIG. 1.

FIG. 2 is an end-on axial view that illustrates schematic configurations of the fixing device 300 and the 3D display lens forming unit 301 provided in the apparatus body 100 of the image forming apparatus.

Referring to FIG. 2, the fixing device 300 includes a belt-shaped fixing member 1, a fixing roller 2, a heating roller 3, and a pressure roller 4. The fixing member 1 is stretched around the fixing roller 2 and the heating roller 3, and the pressure roller 4 is rotatively pressed against the fixing member 1, forming a fixing nip N1 therebetween.

The fixing member 1 is an endless belt and may have a double-layered structure including a base and an elastic layer such as a silicone rubber layer formed on the base. For example, materials of the base include nickel, stainless steel, and polyimide. The fixing roller 2 includes a metal core and an elastic layer formed of, for example, silicone rubber formed on the metal core. Alternatively, silicone rubber foam may be used to inhibit the fixing roller 2 from drawing heat from the fixing member 1, thereby shortening the warm-up time. For example, the heating roller 3 is an aluminum or iron hollow roller, and a heater 3_h_ such as a halogen heater is provided inside the hollow roller as a heat source.

When the fixing device 300 is driven, for example, the fixing roller 2 serves as a driving roller and rotates counterclockwise in FIG. 2, and the fixing member 1 is rotated in a direction in which the sheet P is discharged (counterclockwise in FIG. 2) while kept taut. Then, the pressure roller 4 is driven to rotate. The driving roller is not limited to the fixing roller 2 but may be the pressure roller 4 or the heating roller 3. In image fixing, the fixing member 1 is heated by the heater 3_h_ provided inside the heating roller 3 until its temperature detected by a thermistor rises to a predetermined temperature, for example, suitable for toner fixing. It is to be noted that, although the fixing member 1 in the present embodiment is belt-shaped (endless belt) as shown in FIG. 2, the fixing member 1 is not limited thereto but may be a hollow cylindrical roller (fixing roller), for example.

The pressure roller 4 is, typically, a cylindrical roller and includes a metal core and an elastic layer formed on the metal core. Examples of the material of the metal core include aluminum and iron, and examples of the elastic layer include silicone rubber. Additionally, a bias member presses the pressure roller 4 with a constant pressure against the fixing member 1. A heater may be provided also inside the pressure roller 4 to heat the pressure roller 4 to a predetermined temperature as required, for example, for image fixing.

In the fixing device 300, the fixing member 1 and the pressure roller 4 are rotated, and the surface of the fixing member 1 is heated to the predetermined temperature. In this state, the sheet P carrying the unfixed toner T is transported through the fixing nip N1 (in FIG. 2, from the left to right), and the toner T is fused and fixed on the sheet P with heat and pressure in the fixing nip N1. Thus, the toner image and the transparent layer transferred onto the sheet P can be fixed thereon with a higher degree of adhesion.

As shown in FIG. 2, the 3D display lens forming unit 301 is positioned downstream from the fixing device 300 in the sheet conveyance direction. The shaping belt 30 serving as the shaping member is stretched around a heating roller 36 and a separation roller 37. Additionally, the pressure roller 40 serving as a pressure member is pressed against the heating roller 36 via the shaping belt 30, forming a shaping nip N2 therebetween. As the pressure roller 40 is driven by a motor, not shown, the shaping belt 30, the heating roller 36, and the separation roller 37 are rotated.

The shaping belt 30 is such a member that has predetermined surface unevenness. For example, the shaping belt 30 may has a thickness within a range from 10 μm to 200 μm and be shaped into an endless belt having an external diameter within a range from 80 mm to 300 mm. Examples of materials of the shaping belt 30 include heat-resistant resin such as polyimide and polyamide, and metal such as nickel and stainless steel. It is preferable that an elastic surface layer having a thickness within a range from 5 μm to 50 μm be formed on the shaping belt 30 to enhance contact with the toner on the sheet P. Examples of the material of the elastic layer include silicone rubber.

The heating roller 36 has an external diameter within a range from 30 mm to 50 mm, and examples of the material of the heating roller 36 include aluminum, stainless steel, and iron. It is to be noted that an elastic layer, such as a silicone rubber layer, that has a thickness within a range from 0.5 mm to 2 mm may be provided as a surface layer of the heating roller 36 to increase the width of the shaping nip N2 with the pressure roller 40. The separation roller 37 has an external diameter within a range from 10 mm to 30 mm, and examples of the material of the separation roller 37 include aluminum, stainless steel, and iron.

The pressure roller 40 has an external diameter within a range from 30 mm to 50 mm and includes a metal core roller, an elastic layer of 1 mm to 30 mm, overlaying the metal core roller, and a release layer of 5 μm to 50 μm that is an outermost layer. Examples of the material of the elastic layer include fluorocarbon rubber layer and silicone rubber, and examples of the material of the release layer include fluorine compounds.

The pressure roller 40 can be moved by a cam to contact and to be disengaged from the shaping belt 30. The width of the shaping nip N2 and the load can be adjusted by varying the distance between the shafts of the pressure roller 40 and the heating roller 36. For example, when the user does not want to shape the toner image or the transparent layer formed on the sheet P with the shaping belt 30, the distance between the heating roller 36 and the pressure roller 40 can be changed so that the pressure roller 40 is disengaged from the shaping belt 30 or contacts the shaping belt 30 only slightly according to operation data set by the user.

It is preferable that the 3D display lens forming unit 301 have a heater 33 to heat the shaping belt 30. For example, the heater 33 in the configuration shown in FIG. 2 is a halogen heater (hereinafter "halogen heater 33") provided inside the heating roller 36, and a contactless temperature detector 56 monitors the temperature of the outer layer of the shaping belt 30. A controller 101 controls heating by the halogen heater 33 to keep the temperature of the shaping belt 30 at a predetermined temperature. With this configuration, the toner image and the transparent layer fixed on the sheet P can be softened, enhancing their moldability when pressed by the shaping belt 30.

Additionally, it is preferable that the 3D display lens forming unit 301 have a cooler 41 to cool the sheet P after the sheet P is pressed against the shaping belt 30. For example, the cooler 41 in the configuration shown in FIG. 2 is a cooling fan (hereinafter "cooling fan 41") provided inside the pressure roller 40, and a temperature detector electrically connected to the controller 101 monitors the surface temperature of the pressure roller 40. The controller 101 controls the quantity and velocity of air supplied by the cooling fan 41 to keep the temperature of the pressure roller 40 at a predetermined temperature. Alternatively, the cooler 41 may be a heat sink, a fan, a heat pipe, or a Peltier device provided on an inner circumferential side of the shaping belt 30 downstream form the shaping nip N2 in the sheet conveyance direction to cool the shaping belt 30 downstream from the shaping nip N2. With this configuration, after being shaped by the shaping belt 30, the transparent layer positioned outermost on the sheet P can be immediately cooled, and its shape can be fixed.

Description are given below of printing operations in the image forming apparatus including the above-described fixing device 300 and the 3D display lens forming unit 301 with reference to a flowchart of 3D image formation shown in FIG. 3.

At S11, when a printing signal is input to the apparatus, a toner image and a transparent layer formed by the image forming unit (i.e., image forming stations 10) is transferred onto a sheet P. It is to be noted that it is preferable that the transparent layer formed of the transparent toner have the surface unevenness negative to the surface unevenness on the sheet P created by the color toner image to make the transparent layer a smooth outer surface of the sheet P when fixed thereon. Further, the amount of transparent toner adhering to the sheet P can be adjusted to such a thickness that the surface unevenness of the shaping belt 30 does not disturb the color toner image when the sheet P is pressed in the 3D display lens forming unit 301.

At S12, the unfixed color toner image and the transparent layer are fixed on the sheet P as the sheet P passes through the fixing device 300. At S13, after image fixing, the sheet P is transported to the 3D display lens forming unit 301. Because the distance between the fixing nip N1 in the fixing device 300 and the shaping nip N2 in the 3D display lens forming unit 301 is relatively small such as about 50 mm to 200 mm in the present embodiment, the toner image (color toner and transparent toner) on the sheet P discharged from the fixing device 300 can maintain a low fluidity when introduced to the shaping nip N2 in the 3D display lens forming unit 301.

At S14, the fluidity of the toner image on the sheet P is maintained by the heated shaping belt 30 in the 3D display lens forming unit 301. More specifically, the heating roller 36 heats the shaping belt 30, and the temperature of the shaping belt 30 at an entrance of the shaping nip N2 is adjusted to a range from about 100° C. to 150° C. Further, the cooling fan 41 cools the pressure roller 40 to a temperature lower by about 20° C. to 80° C. than the controlled temperature of the shaping belt 30.

At S15 the sheet P passes through the shaping nip N2 formed between the heating roller 36 and the pressure roller 40 via the shaping belt 30. At that time, the toner image (including the clear layer) on the sheet P is directly pressed against the shaping belt 30 and then again heated and pressed in the shaping nip N2. Consequently, the transparent layer that is the outermost layer can be molded, conforming to the predetermined surface unevenness of the shaping belt 30.

At S16, after discharged from the shaping nip N2, the sheet P remains adhering to the shaping belt 30 and transported further by the shaping belt 30. At that time, the backside of the sheet P contacts the cooled pressure roller 40, and can be cooled promptly while being transported. Accordingly, the softened or melted transparent toner after shaped by the shaping belt 30 can solidify in conformity to the surface unevenness of the shaping belt 30 and becomes a stereoscopic display lens having a predetermined shape. At S17, the sheet P is separated by the separation roller 37 through curvature separation and then discharged to the stack unit 27.

Because the transparent layer constructed of the transparent toner is made into the stereoscopic display lens as described above, 3D images having good adhesion among the stereoscopic display lens, the toner image, and the sheet P can be produced without special materials or mechanism. Further, addition of a relatively simple mechanism (3D display lens forming unit 301) enables existing image forming systems to produce fine stereoscopic display lenses with a higher degree of accuracy. Moreover, the image forming apparatus can become more compact, and the quality of 3D images can be improved.

It is to be noted that the stereoscopic display lenses may be lenticular lenses or fly's eye lenses, for example.

A lenticular lens is formed with multiples fine slim semicylindrical convex lenses arranged in parallel to each other. To make the image stereoscopic, the lenticular lens is positioned so that the semicylindrical convex lenses are arranged in the lateral direction of viewers.

Figure 4:
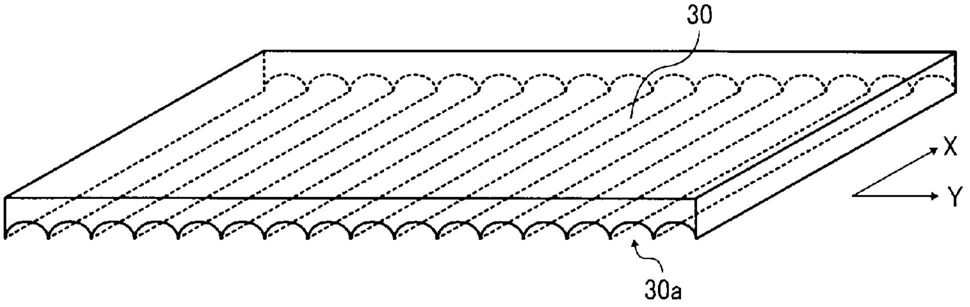
FIG. 4 is an enlarged perspective view that illustrates a surface unevenness of the shaping belt.

FIG. 4 is an enlarged view of the outer circumferential surface of the shaping belt 30 to produce lenticular lenses.

As shown in FIG. 4, multiple semicylindrical recesses 30*a* are arranged with their long axes (in the direction indicated by arrow X) parallel to each other on the surface of the shaping belt 30 to make it uneven to produce lenticular lenses. For example, the arrangement pitch of the recesses 30*a* is within a range from 100 μm to 1 mm. The longitudinal direction, indicated by arrow X shown in FIG. 4, of the recesses 30*a* parallels the width direction of the shaping belt 30, and the arrangement direction of the recesses 30*a*, indicated by arrow Y shown in FIG. 4, parallels the circumferential direction of the shaping belt 30.

A fly's eye lens as a stereoscopic display lens is formed with single lenses arranged in matrix. When fly's eye lenses are designed for 3D images, the image can be stereoscopic in either laterally and vertically, and thus stereoscopic effects can be higher than lenticular lenses.

Figure 5:
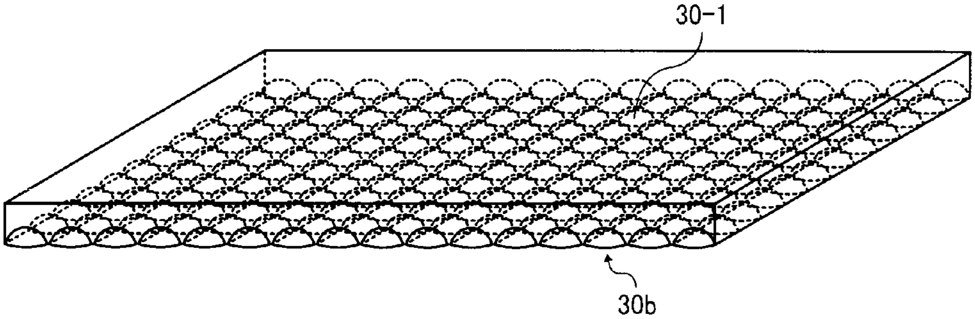
FIG. 5 is an enlarged perspective view that illustrates a surface unevenness of another shaping belt.

FIG. 5 is an enlarged view of an outer circumferential surface of a shaping belt 30-1 to produce fly's eye lenses. As shown in FIG. 5, multiple hemispherical recesses 30*b* for forming single lenses are arranged in matrix on the surface of the shaping belt 30-1 to make it uneven to produce fly's eye lenses. The arrangement direction of the recesses 30*b* on the shaping belt 30-1 is not limited.

It is preferable that, when producing 3D images, the image forming unit form toner images corresponding to the stereoscopic display lens, created by the shaping belt 30, on the sheet P.

For example, toner images for lenticular lenses are produced by combining two images for left eye and right eye to cause parallax. Multiple images are cut in strips, and the toner image strips are sequentially arranged into an interlace to produce a single image.

Additionally, the toner image strips should be aligned with the convex lenses forming the lenticular lens in a manner that one convex lens is positioned on each toner image strip. More specifically, it is preferred that the 3D display lens forming unit 301 have an alignment unit to control conveyance of the sheet, driving of the shaping belt 30, or both, thereby aligning the toner image for stereoscopic display formed on the sheet P with the predetermined position on the uneven surface of the shaping belt 30.

More specifically, as shown in FIG. 2, an alignment mark 58 is provided at a predetermined circumferential position of the shaping belt 30, and the 3D display lens forming unit 301 further includes a contactless optical sensor 57 to detect the alignment mark.

Further, a leading end position of the sheet at which the toner image and the transparent layer are formed is predetermined. When the sheet passes through the 3D display lens forming unit 301, pressing of the toner image formed on the sheet P is started constantly at the same position of the shaping belt 30 with the alignment mark 58 as a home position. This operation can enhance the accuracy in positioning of the lenticular lens on the divided image strips that are 3D image-to-be, thus reducing or preventing imaging deviation, namely, image blurring.

It is to be noted that when fly's eye lenses are used as the stereoscopic display lens, the image forming unit should form toner images for stereoscopic display on sheets P similarly to lenticular lenses, and the above-described alignment unit aligns the toner image strips with the fly's eye lens in a manner that one convex lens is positioned on each toner image strip.

Figure 6:
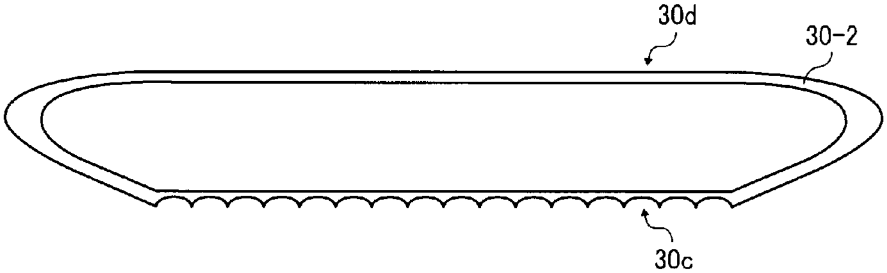
FIG. 6 is a cross-sectional view that illustrates a surface unevenness of another shaping belt.

Although the fine recesses are formed in the entire outer circumferential surface of the shaping belt 30 (or 30-1) in the description above, alternatively, the shaping belt 30 may include an uneven portion and a smooth portion as shown in FIG. 6. FIG. 6 illustrates a shaping belt 30-2, as another configuration for forming stereoscopic display lenses, that includes an uneven portion 30*c* and a smooth portion 30*d* in its outer circumferential surface. This configuration can enhance the quality of 3D images.

Figure 7:
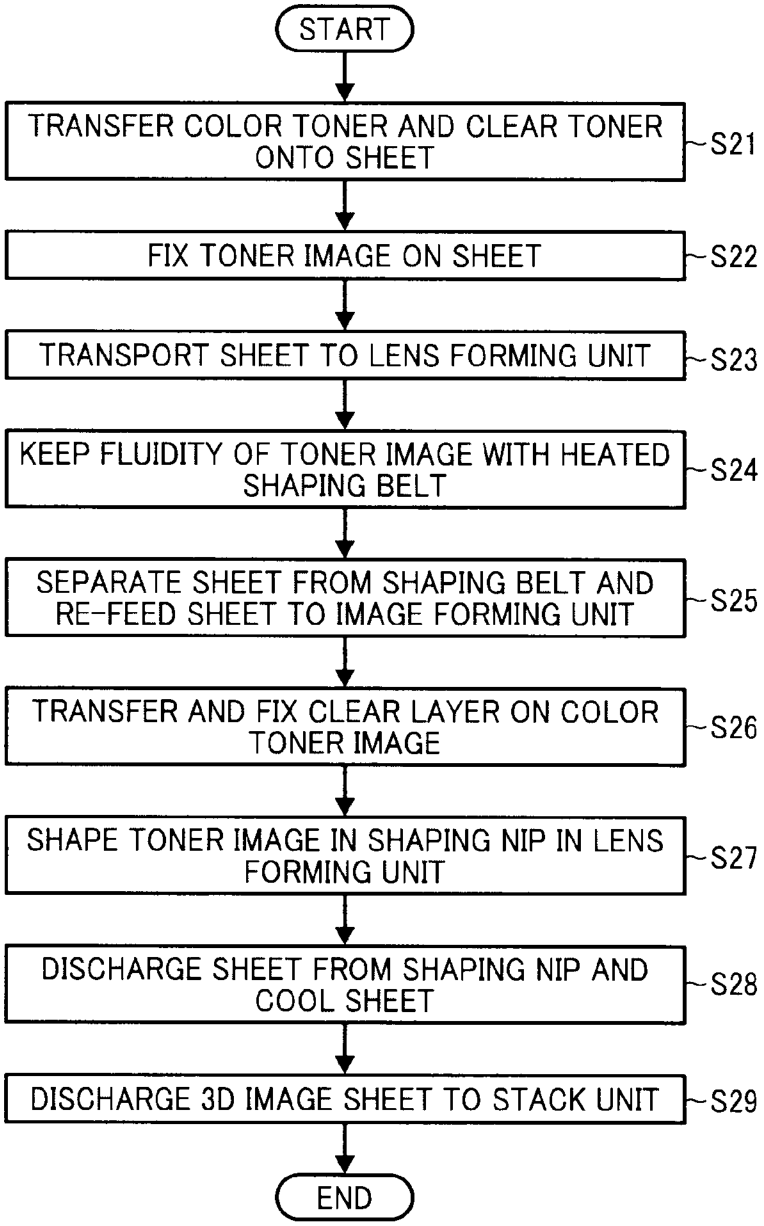
FIG. 7 is a flowchart of 3D image formation according to another illustrative embodiment.

Printing operation using this configuration is described below with reference to a flowchart of 3D image formation shown in FIG. 7.

At S21, when a printing signal is input to the apparatus, a toner image, or a toner image and a transparent layer, formed by the image forming unit (i.e., image forming stations 10) is transferred onto a sheet P. At S22, the unfixed color toner image, or the color toner image and the transparent layer are fixed on the sheet P as the sheet P passes through the fixing device 300. At S23, after image fixing, the sheet P is transported to the 3D display lens forming unit 301. The state or conditions of the 3D display lens forming unit 301 at that time are similar those at S13 and S14 in FIG. 3.

The sheet P passes through the shaping nip N2 formed between the heating roller 36 and the pressure roller 40 via the shaping belt 30-2. At that time, the fixed toner image (color toner image or color toner image and transparent layer) on the sheet P is directly pressed against the smooth portion 30*d* of the shaping belt 30-2 and again heated and pressed in the shaping nip N2. Consequently, the toner layer can be molded conforming to the shape of the smooth portion 30*d* of the shaping belt 30-2.

At S24, after discharged from the shaping nip N2, the sheet P remains adhering to the shaping belt 30-2 and transported further by the shaping belt 30-2. At that time, the backside of the sheet P contacts the cooled pressure roller 40, and can be cooled promptly while being transported. Accordingly, the softened or melted toner smoothed by the smooth portion 30*d* can solidify as is.

At S25, the sheet P carrying the smooth toner image is separated by the separation roller 37 from the shaping belt 30-2 through curvature separation and transported again to the image forming unit by the re-feeding unit 92. At S26, a transparent layer is transferred onto the smooth toner image in the image forming unit and then is fixed thereon while the sheet P passes through the fixing device 300. At S27, after image fixing, the sheet P is transported to the 3D display lens forming unit 301. The state or conditions of the 3D display lens forming unit 301 at that time are similar those at S13 and S14 in FIG. 3.

The sheet P passes through the shaping nip N2 formed between the heating roller 36 and the pressure roller 40 via the shaping belt 30-2. At that time, the toner image (clear layer) on the sheet P is directly pressed against the uneven portion 30*c* of the shaping belt 30-2, and then again heated and pressed in the shaping nip N2. Consequently, the transparent layer that is the outermost layer can be molded, conforming to the predetermined surface unevenness of the uneven portion 30*c* of the shaping belt 30-2.

At S28, after discharged from the shaping nip N2, the sheet P remains adhering to the shaping belt 30-2 and transported further by the shaping belt 30-2. At that time, the backside of the sheet P contacts the cooled pressure roller 40, and can be cooled promptly while being transported. Accordingly, the softened or melted transparent layer (transparent toner) can solidify in conformity to the surface unevenness of the uneven portion 30*c* of the shaping belt 30-2 and becomes a stereoscopic display lens having a predetermined shape.

At S29, the sheet P is separated from the shaping belt 30-2 by the separation roller 37 through curvature separation and then discharged to the stack unit 27.

It is to be noted that it is preferable that a 3D image mode and an increased gloss mode be selectable in the above-described image forming apparatus.

Figure 3:
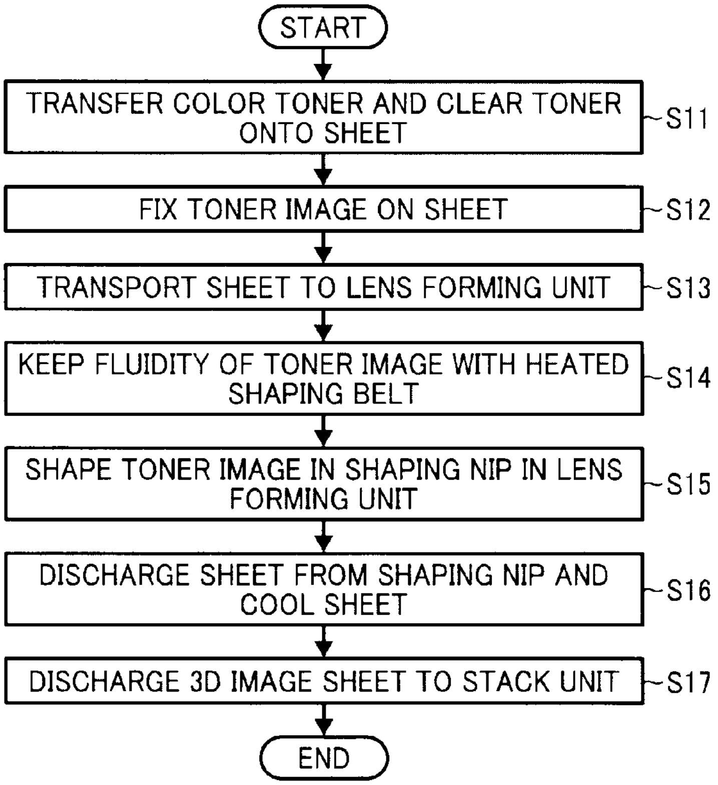
FIG. 3 is a flowchart of 3D image formation according to an illustrative embodiment.

When the 3D image mode is selected, the 3D display lens forming unit 301 presses the uneven portion 30*c* of the shaping belt 30-2 against the transparent layer that is the outermost layer on the sheet P, and a 3D image is formed through the steps from S11 through S17 shown in FIG. 3. When the increased gloss mode is selected, the 3D display lens forming unit 301 presses the smooth portion 30*d* of the shaping belt 30-2 against the transparent layer that is the outermost layer on the sheet P, and a high-gloss image is formed through the steps S21 through S24 shown in FIG. 7, after which the high-gloss image is discharged to the stack unit 27.

As described above, in the present embodiment, the smooth portion 30*d* and the uneven portion 30*c* are formed on the outer circumferential surface of the shaping belt 30-2, and the user can select the 3D image mode or the increased gloss mode (high-gloss mode) as appropriate. Thus, the image forming apparatus can operate in the mode for producing high-gloss images in addition to the 3D image mode. Further, 3D images of a higher quality can be produced using the smooth portion 30*d* and the uneven portion 30*c* of the shaping belt 30-2 as appropriate.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image forming apparatus, comprising:

an image forming unit including an color toner station to form a color toner image using a color toner and a transparent toner station to form a transparent layer using a transparent toner on a sheet of recording media;

a sheet conveyance unit to transport the sheet;

a 3D display lens forming unit disposed downstream from the image forming unit in a sheet conveyance direction in which the sheet is transported, the 3D display lens forming unit including a rotatable shaping member including an uneven portion having predetermined surface unevenness at a certain circumferential position on the rotatable shaping member in the direction of rotation of the rotatable shaping member, and further including a smooth portion at another circumferential position on the rotatable shaping member in the direction of rotation of the rotatable shaping member, and a pressure member to press the shaping member against an imaging surface of the sheet, forming a shaping nip between the shaping member and the pressure member; and a controller operatively connected to the image forming apparatus as well as the 3D display lens forming unit, wherein the 3D display lens forming unit shapes the transparent layer that is an outermost layer on the sheet into a stereoscopic display lens by transferring the surface unevenness of the uneven portion of the shaping member to the transparent layer formed on the sheet, wherein a 3D image mode and an increased gloss mode are selectable as an image formation mode, in the 3D image mode, the 3D display lens forming unit presses the uneven portion of the shaping member against the transparent layer that is the outermost layer on the sheet, and, in the increased gloss mode, the 3D display lens forming unit presses the smooth portion of the shaping member against the transparent layer formed on the sheet.

2. The image forming apparatus according to claim 1, wherein the image forming unit forms the color toner image corresponding to the stereoscopic display lens on the sheet.

3. The image forming apparatus according to claim 2, wherein the 3D display lens forming unit further comprises an alignment unit to align the color toner image for stereoscopic display formed on the sheet with a predetermined position in the uneven portion of the shaping member.

4. The image forming apparatus according to claim 3, wherein an alignment mark is provided in the uneven portion of the shaping member, the alignment unit comprises a contactless optical detector to detect the alignment mark in the uneven portion of the shaping member, and the controller controls at least one of conveyance of the sheet and driving of the shaping member.

5. The image forming apparatus according to claim 1, wherein the 3D display lens forming unit further comprises a heater to heat the shaping member; and a cooling unit disposed downstream from the shaping nip formed between the shaping member and the pressure member to cool the sheet after the sheet is pressed against the shaping member.

6. The image forming apparatus according to claim 1, wherein the 3D display lens forming unit further comprises:

a facing roller disposed facing the pressure roller; and a support roller, wherein the shaping member is an endless belt stretched around the facing roller and the support roller, and the pressure member presses against the facing roller via the shaping member.

7. An image forming apparatus, comprising:

an image forming unit including an color toner station to form a color toner image using a color toner and a transparent toner station to form a transparent layer using a transparent toner on a sheet of recording media;

a sheet conveyance unit to transport the sheet;

a 3D display lens forming unit disposed downstream from the image forming unit in a sheet conveyance direction in which the sheet is transported, the 3D display lens forming unit including a shaping member including a smooth portion and an uneven portion having predetermined surface unevenness, and a pressure member to press the shaping member against an imaging surface of the sheet, forming a shaping nip between the shaping member and the pressure member; and a controller operatively connected to the image forming apparatus as well as the 3D display lens forming unit, wherein the 3D display lens forming unit shapes the transparent layer that is an outermost layer on the sheet into a stereoscopic display lens by transferring the surface unevenness of the uneven portion of the shaping member to the transparent layer formed on the sheet; and a re-feeding unit disposed downstream from the 3D display lens forming unit in the sheet conveyance direction to send the sheet again to the image forming unit after the sheet is discharged from the 3D display lens forming unit, the 3D display lens forming unit presses the smooth portion of the shaping member against the color toner image formed on the sheet to smooth the color toner image, the image forming unit forms a transparent layer on the smoothed color toner image, and the pressure member of the 3D display lens forming unit presses the uneven portion of the shaping member against the transparent layer formed on the color toner image.

8. An image forming apparatus, comprising:

an image forming unit including an color toner station to form a color toner image using a color toner and a transparent toner station to form a transparent layer using a transparent toner on a sheet of recording media;

a sheet conveyance unit to transport the sheet;

a 3D display lens forming unit disposed downstream from the image forming unit in a sheet conveyance direction in which the sheet is transported, the 3D display lens forming unit including a shaping member including a smooth portion and an uneven portion having predetermined surface unevenness, and a pressure member to press the shaping member against an imaging surface of the sheet, forming a shaping nip between the shaping member and the pressure member; and a controller operatively connected to the image forming apparatus as well as the 3D display lens forming unit, wherein the 3D display lens forming unit shapes the transparent layer that is an outermost layer on the sheet into a stereoscopic display lens by transferring the surface unevenness of the uneven portion of the shaping member to the transparent layer formed on the sheet; and a re-feeding unit disposed downstream from the 3D display lens forming unit in the sheet conveyance direction to send the sheet again to the image forming unit after the sheet is discharged from the 3D display lens forming unit, the 3D display lens forming unit presses the smooth portion of the shaping member against a first transparent layer formed on the color toner image on the sheet to smooth the first transparent layer, the image forming unit forms a second transparent layer on the smoothed first transparent layer, and the 3D display lens forming unit presses the uneven portion of the shaping member against the second transparent layer.

9. The image forming apparatus according to claim 1, wherein the 3D display lens forming unit forms a lenticular lens or a fly's eye lens as the stereoscopic display lens.

10. The image forming apparatus according to claim 1, further comprising a fixing device disposed upstream from the 3D display lens forming unit in the sheet conveyance direction to fix the color toner image and the transparent image formed on the sheet so that the color toner image and the transparent image maintain a low fluidity.

* * * * *